United States Patent [19]

Weiler

[11] 4,273,512

[45] Jun. 16, 1981

[54] COMPRESSOR ROTOR WHEEL AND METHOD OF MAKING SAME

[75] Inventor: Wolfgang Weiler, Dachau, Fed. Rep. of Germany

[73] Assignee: MTU Motoren-und Turbinen-Union Munchen GmbH, Munich, Fed. Rep. of Germany

[21] Appl. No.: 56,526

[22] Filed: Jul. 11, 1979

[30] Foreign Application Priority Data

Jul. 11, 1978 [DE] Fed. Rep. of Germany ....... 2830358

[51] Int. Cl.[3] ....................... B23P 15/02; F04D 29/28

[52] U.S. Cl. ............................ 416/188; 29/156.8 CF; 416/213 R; 416/244 A

[58] Field of Search ............... 416/213 R, 244 A, 185, 416/188, 241 R; 29/156.8 CF

[56] References Cited

U.S. PATENT DOCUMENTS 3,945,101 3/1976 Rossman et al. ............. 29/156.8 CF

FOREIGN PATENT DOCUMENTS 2510286 9/1976 Fed. Rep. of Germany ...... 416/244 A 1228159 4/1971 United Kingdom ............... 29/156.8 R

*Primary Examiner*—Leonard E. Smith

*Attorney, Agent, or Firm*—Craig and Antonelli

[57] ABSTRACT

A compressor rotor wheel construction and a method of making same is provided which includes a blade portion of heat-resistant metallic material, a rotor disk portion made of a high-strength metallic material, and a steel spacer ring arrangement connecting the blade and rotor disk portions. The steel spacer rings are connected by explosion welding to the blade portion, are then finish machined, as is the rotor portion, and then the spacer rings are connected respectively to the rotor disk portion by brazing or welding.

9 Claims, 2 Drawing Figures

COMPRESSOR ROTOR WHEEL AND METHOD OF MAKING SAME

BACKGROUND AND SUMMARY OF THE INVENTION

This invention relates to a compressor rotor wheel, and more particularly to a centrifugal compressor rotor wheel, for turbomachines the blade portions of which are made of a heat-resistant metallic material and the rotor disk portions of which are made of a high-strength metallic material, where a coaxially extending steel connection is provided between the blade region and the disk region.

Small gas turbine engines of both the turbojet and the turboshaft configurations are normally fitted with centrifugal or combined axial-radial flow compressors. While such engines may occasionally come recommended for their rather attractive specific fuel consumptions and power weight ratios their acceleration capability at abrupt load changes often leaves room for improvement. This is attributed to the fact that the polar moment of inertia of the rotor, by its very conception, is higher than with gas turbine engines having a straight axial-flow compressor, where the centrifugal cmpressor normally carries the largest single share.

Various recommendations made in an attempt to reduce the polar moment of inertia of centrifugal compressor rotor wheels seek their solutions in breaking the monolithic rotor wheel down into several assemblies, where e.g. the bladed shell is self-supported and is connected to the hub region by no means other than flexible and/or interlocking elements. There are obvious limitations on the use of this construction at elevated speeds and temperatures.

Other solutions have been proposed in which the monolithic rotor wheel is broken down into blades, the shell carrying the blades, and disks absorbing radial forces, where the various constituent parts are optimized for their specific functions and are then brazed together. Owing to the brazing properties of the materials lending itself to the purpose, all constituent parts are necessarily made of high-strength, i.e. similar materials. This means, however, that the outer and more moderately stressed zones, which nevertheless cause the major portion of the moment of inertia of a centrifugal compressor rotor wheel, must equally be made of steel although materials of less density, such as titanium, would fully do the job at these locations.

In a broad aspect the present invention provides a rotor wheel of said description which, using dissimilar materials for the blade region and for the disk region that cannot be brazed and/or conventionally welded together, will be low in mass and inertia.

It is a particular object of the present invention to provide a compressor rotor wheel, especially a centrifugal compressor rotor wheel which is low in mass and inertia by breaking the monolithic wheel into two or more regions, where the blades and the shell carrying them are manufactured as an integral part from a suitable heat-resistant alloy of low density, such as a titanium alloy, and where the load-bearing disk-like parts are made of a high-strength material, such as a martensitic steel alloy. In this arrangement the parts are joined together via one each, conceivably segmented spacer ring of steel explosion welded to the bladed shell and then brazed to the load-bearing disk-like parts or conceivably connected to these parts by fusion or friction welding.

The use of the explosion welding process to join steel and titanium alloys together is being practiced in the construction of chemical apparatus, where it is used to produce perfect surface area connections of relatively thin titanium panels to steel components. Explosion welding has also been cited in German patent specification 25 10 286.

The extremely brittle zones known from various experiments exploring the intimate connection of steel to titanium parts by brazing and diffusion, friction or electron beam welding to occur in the joint area are avoided because the welding process is extremely fast.

In a further aspect of the present invention the explosion welded joints are made before the bladed steel is machined, said shell being optionally machined from the solid, cast or manufactured powder metallurgically. Should explosion welding cause inaccuracies, these can be eliminated in the course of mechanical machining aimed at preparing the abutting areas between the spacer ring and the load-bearing disk-like parts. These corrections may conceivably be made also when the rotor wheel is finish machined, when especially the rear wall of the wheel is worked down mechanically or electrochemically in the outer diameter area to a minimum wall thickness imposed by the risk of deformation and/or by manufacturing requirements.

In a further aspect of the present invention the load-bearing disk-like parts are made of a high-strength titanium alloy, where the said parts are joined to the bladed shell via two, conceivably segmented spacer rings of a steel alloy, the rings being first joined by explosion welding to the respective adjacent component and then being brazed or conceivably welded together.

The purpose of the steel spacer rings between the two major assemblies made of dissimilar titanium alloys is to avoid brittle areas that would be inevitable when the parts are welded together. When they are brazed together, the difficulties resulting from the propensity of titanium for oxidation are eliminated, and the problems posed by the unlike heat treatments used in the aging of the finished assembly composed of dissimilar titanium alloys are alleviated by suitable selection of the braze alloy and the brazing temperature.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
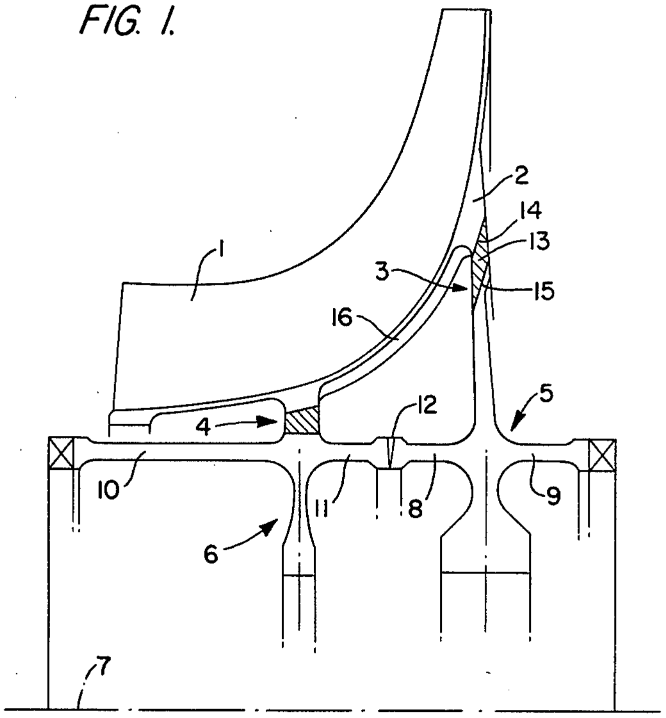
FIG. 1 is a side elevational partial sectional view illustrating a centrifugal compressor rotor wheel section constructed in accordance with a first preferred embodiment of the invention.

With reference now to FIG. 1, the centrifugal compressor rotor exhibits a shell 2 carrying centrifugal compressor rotor blades 1 and being formed as an integral part from a suitable, heat-resistant alloy of low density, such as a titanium alloy. Together with the centrifugal compressor rotor blades 1 this shell is made as a casting, is machined from the solid or is manufactured by powder metallurgy.

At two axially and radially spaced-apart points 3 and 4 the shell 2 is connected to rotor disk sections 5 and 6 via steel connections. The sections 5, 6 exhibit axially projecting annular portions 8, 9 and 10, 11, respectively, extending coaxially to the rotor centerline 7. The two rotor disk sections 5, 6 are welded together at a point 12 lying between the two annular portions 8, 11.

Indicated in FIG. 1 by the numeral 13 is a steel spacer ring which in a preferred aspect of the present invention is initially joined to the shell 2 by an explosion welding process (explosion weld 14).

Following removal of any inaccuracies possibly caused by the explosion welding process and perhaps after finishing the shell 2 carrying the centrifugal rotor blades 1, the shell 2 is then welded or brazed to the rotor disk sections 5 and 6, respectively, where the brazed or welded joint between the spacer ring 13 and the respective associated rotor disk portion 5 is indicated by the numeral 15. The connection of the shell 2 to the rotor disk section 6 at point 4 is made in the same manner and sequence used at said point 3.

In a preferred aspect of the present invention the rotor disk sections 5 and 6 are made of a high-strength steel alloy.

The relatively thin-walled shell 2 may optionally be provided with additional stiffening ribs 16.

Figure 2:
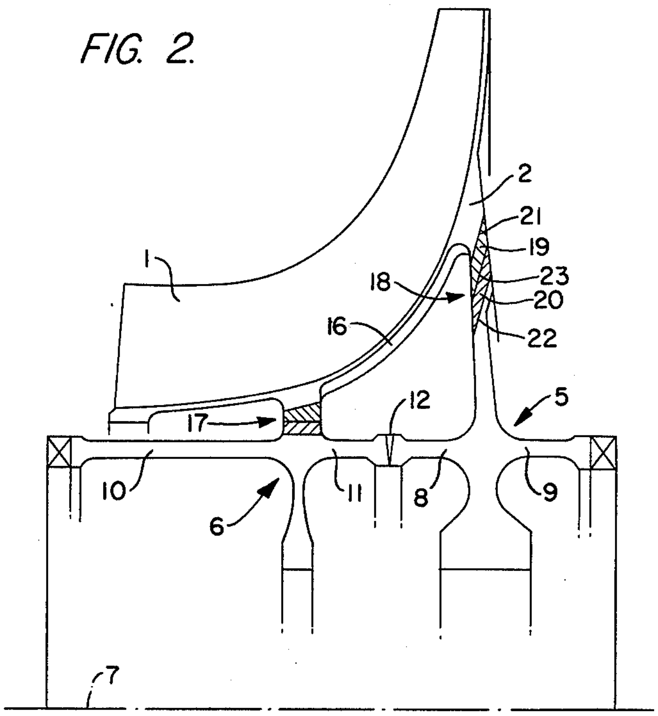
FIG. 2 is a side elevational partial sectional view illustrating a centrifugal compressor rotor wheel section constructed in accordance with an alternative embodiment of the invention.

FIG. 2 uses the same numerals for the same parts used in FIG. 1 and varies from FIG. 1 cardinally in that two steel spacer rings 19, 20 are provided for the respective steel connections at points 17 and 18.

In a preferred aspect of the present invention the first step taken in the manufacture of the blade-to-disk connection is the explosion weld operation, where the spacer ring 19 is first joined to the shell 2 by explosion welding (explosion weld 21) while on the other side the spacer ring 20 is first joined by explosion welding to the respective rotor disk section 5 and 6, respectively (explosion weld 22).

In a preferred aspect of the present invention the shell 2 is brazed or welded to the rotor disk sections 5 and 6, respectively, not until after the shell is finish machined or not until after inaccuracies possibly caused by the explosion welding process have been eliminated. The respective braze or weld joint between the two spacer rings 19, 20 is indicated in FIG. 2 by the numeral 23.

The steel connection at point 17 is produced in the manner just discussed in connection with the steel connection at point 18.

In a preferred aspect of the present invention the embodiment illustrated in FIG. 2 is suited for a blade-to-disk connection where the major components of the rotor, which would here be the shell with its centrifugal compressor rotor blades 1 on the one hand and the rotor disk sections 5 and 6 on the other, are made of dissimilar titanium alloys; namely, from a suitable temperature-resistant alloy for the shell 2 plus blades 1 on the one hand and from a high-strength titanium alloy for the load-bearing rotor disk sections 5 and 6, respectively, on the other.

The spacer rings 13 to 19, 20 of FIG. 1 or FIG. 2 may optionally be composed of various ring segments.

As it will further become apparent from the drawings the spacer rings 13 or 19, 20 are arranged at a relatively steep or obtuse angle with the rotor centerline 7 to provide relatively large welding or brazing faces for relatively high strength of the respective blade-to-disk connection.

It is intended that the invention embrace the use of the rotor wheel in gas turbine engines having combined axial-radial flow compressors as well as in turbochargers.

While I have shown and described several embodiments in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

I claim:

1. Compressor rotor wheel, such as a centrifugal compressor rotor wheel for turbomachines, the blade portions of which are made of a heat-resistant metallic material and the rotor disk portions of which are made of a high-strength metallic material, where a coaxially extending steel connection is provided between the blade portion and the rotor disk portion, characterized in that as the steel connection a spacer ring of steel is provided which is connected on the one side to the blade portion by explosion welding and on the other side to the rotor disk portion by brazing or welding, and characterized in that the rotor wheel region is manufactured as an integral part and essentially consists of a shell carrying the centrifugal compressor blades, where the steel connections containing the spacer rings are respectively provided at at least two axially and radially spaced-apart points associated with each of which are radially aligned rotor disk sections.

2. Compressor rotor wheel according to claim 1, characterized in that as the steel connection, two spacer rings brazed or welded together are provided of which the one is connected to the blade portion by explosion welding and of which the other is connected to the rotor disk portion of the rotor wheel by explosion welding.

3. Compressor rotor wheel according to claim 1, characterized in that it is manufactured of titanium or a titanium alloy in the blade portion and of steel or a steel alloy, as e.g. a martensitic steel alloy, in the load-bearing rotor disk portion.

4. Compressor rotor wheel according to claim 2, characterized in that it consists of a heat-resistant titanium alloy in the blade portion and of a high-strength titanium alloy in the load-bearing rotor disk portion.

5. Compressor rotor wheel according to claim 1 or 2, characterized in that the spacer rings are assembled from ring segments.

6. Method of manufacturing a compressor rotor wheel comprising:

forming a blade portion from heat-resistant metallic material, forming a rotor disk portion from high-strength metallic material which is different from the material forming the blade portion, connecting one side of a spacer ring of steel to the blade portion by explosion welding, and connecting the other side of the spacer ring to the rotor disk portion by brazing or welding, wherein said connecting of the one side of the spacer ring to the blade portion by explosion welding is completed prior to said connecting of the other side of the spacer ring to the rotor disk portion;

wherein, subsequent to the explosion welding connection of the one side of the spacer ring to the blade portion, the respective rotor wheel portions on the blade side and on the rotor disk side are first finish machined before said brazing or welding is performed to finally connect the blade portion to the rotor disk portion by means of the spacer ring; and characterized in that the rotor wheel region is manufactured as an integral part and essentially consists of a shell carrying the centrifugal compressor blades, where the steel connections containing the spacer rings are respectively provided at at least two axially and radially spaced-apart points associated with each of which are radially aligned rotor disk sections.

7. Method according to claim 6, characterized in that it is manufactured of titanium or a titanium alloy in the blade portion and of steel or a steel alloy, as e.g. a martensitic steel alloy, in the load-bearing rotor disk portion.

8. Method according to claim 6, characterized in that it consists of a heat-resistant titanium alloy in the blade portion and of a high-strength titanium alloy in the load-bearing rotor disk portion.

9. Method according to claim 6, characterized in that the spacer rings are assembled from ring segments.

* * * * *